A. J. SPRANGER.
DEMOUNTABLE WHEEL.
APPLICATION FILED JAN. 11, 1919.
1,304,112.
Patented May 20, 1919.
2 SHEETS—SHEET 2.
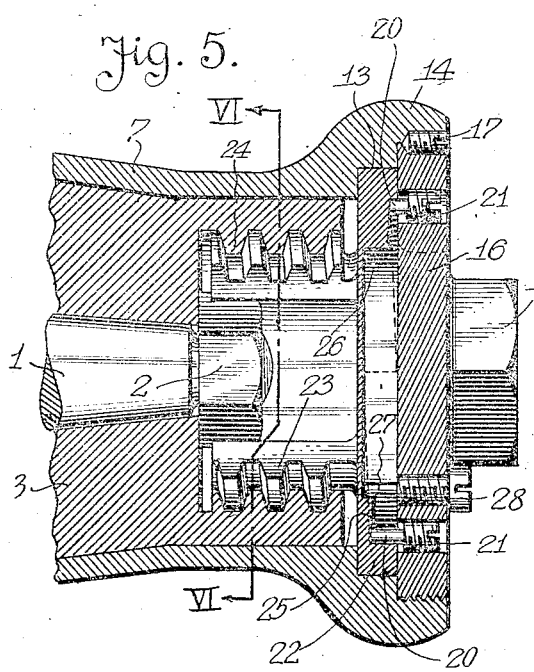
Fig. 5.
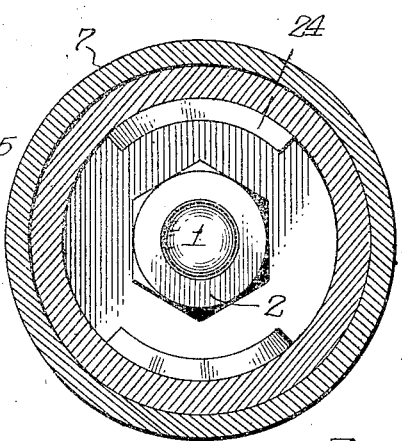
Fig. 6.
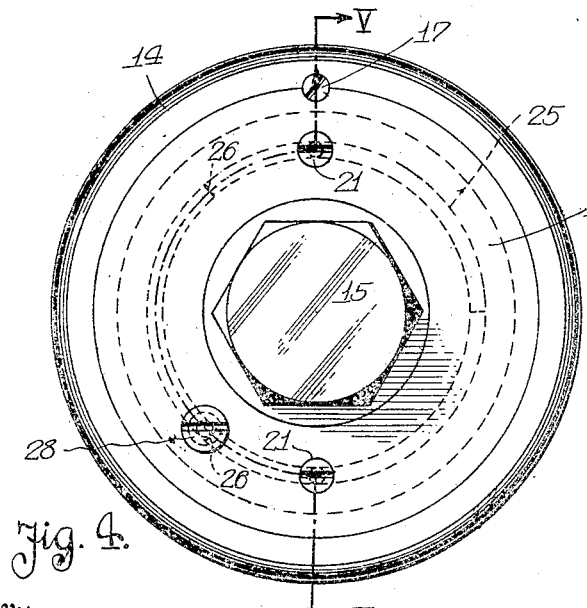
Fig. 4.
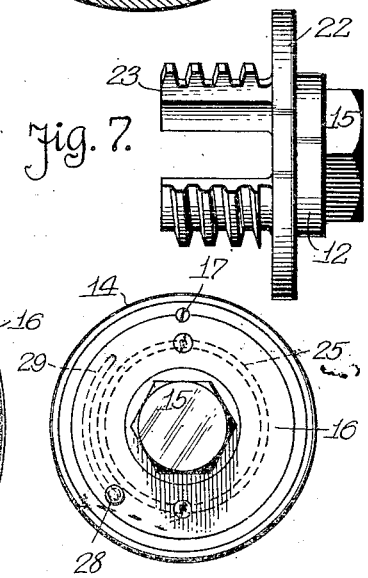
Fig. 7.
Fig. 8.
Witness
Chas. W. Stauffiger
Carl H. Butler
Inventor
Anthony J. Spranger,
By
Attorneys

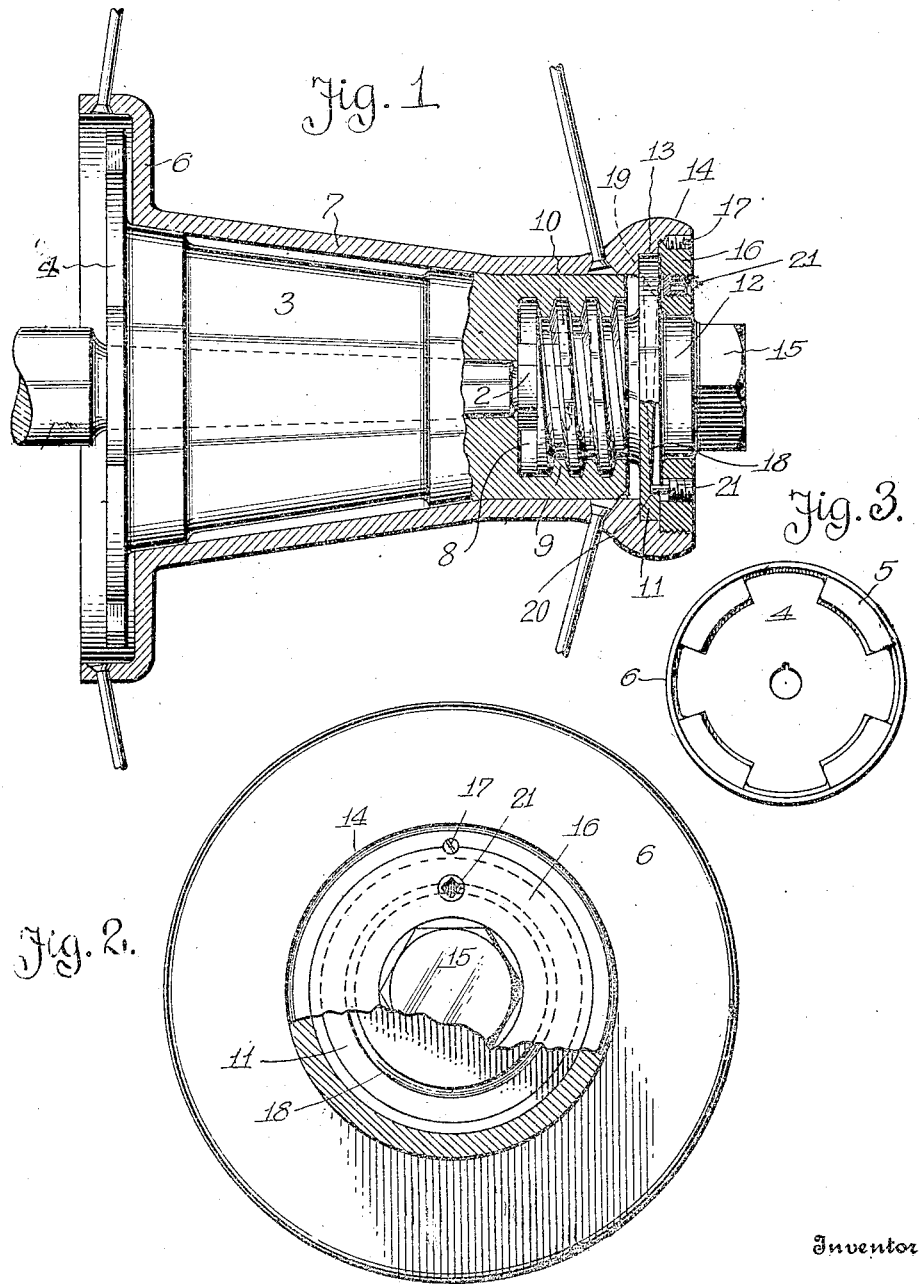

UNITED STATES PATENT OFFICE.

ANTHONY J. SPRANGER, OF DETROIT, MICHIGAN.

DEMOUNTABLE WHEEL.

1,304,112.  Specification of Letters Patent.  Patented May 20, 1919.

Application filed January 11, 1919. Serial No. 270,626.

*To all whom it may concern:*

Be it known that I, ANTHONY J. SPRANGER, a citizen of the United States of America, residing at Detroit, in the county of Wayne and State of Michigan, have invented certain new and useful Improvements in Demountable Wheels, of which the following is a specification, reference being had therein to the accompanying drawings.

In my Patent No. 1,287,493, granted Dec. 10, 1918, there is disclosed a hub construction for vehicle wheels, the construction permitting of a demountable wheel being easily and quickly mounted on the end of an axle or a hub provided therefor, and the wheel being as readily removed, but when in place insuring a positive driving relation between the parts.

This invention aims to simplify the cost of manufacturing without sacrificing strength and durability in the constructive arrangement of parts and provision is made to produce a tightening action or more firm assembly of the hub parts should there be a tendency of certain parts to become loose or accidentally displaced. Such a tightening feature of the invention contributes to the safety of the wheel, and this is accomplished in a manner as hereinafter set forth, which does not materially interfere with production or increase the expense of manufacture when compared with my prior construction.

The present invention will be hereinafter described and then claimed, and reference will now be had to the drawings, wherein—

Figure 1 is a longitudinal sectional view of the hub construction, showing the inner hub partly in elevation;

Fig. 2 is a view of the outer end of the hub construction partly broken away and partly in section;

Fig. 3 is a view, on a small scale, of the inner end of the hub construction;

Fig. 4 is an end view of a modified form of construction;

Fig. 5 is a longitudinal sectional view taken on the line V—V of Fig. 4;

Fig. 6 is a cross-sectional view taken on the line VI—VI;

Fig. 7 is a side elevation of the detached cap, and

Fig. 8 is an end view, on a small scale, of a further modification entering into the hub construction.

As in my prior patent, the construction includes an axle 1 and fixed on the end thereof by a nut 2 is a tapering inner hub 3, having the inner end thereof provided with radially disposed lugs 4 extending between inwardly projecting lugs 5 carried by the inner spoke holding end 6 of an outer hub 7 seated on the inner hub 3.

The outer end of the inner hub 3 differs from my former construction by having a recess 8 with the walls thereof screw-threaded, as at 9, and besides said recess providing clearance for the nut 2, it receives the exteriorly screwthreaded shank 10 of a cap 11 placed on an annular seat 13 in the outer spoke holding end 14 of the outer hub 7. The shank 10 has its inner end recessed, as shown by dotted lines in Fig. 1, to provide clearance for the nut 2 and said shank may be screwed in the outer end of the inner hub 3 without the annular cap 11 contacting with the outer end of the inner hub 3, therefore it is possible to draw the inner hub 3 into the outer hub 7 or force the outer hub 7 on to the inner hub 3.

On the outer face of the cap 11 is a cylindrical portion 12 and a nut 15 the latter accommodating a wrench and the former a retaining ring 16 which is screwed into the outer end 14 of the outer hub 7 and locked in engagement therewith by a small set screw 17 interrupting the threaded portion of the retaining ring.

The outer face of the cap 11, about the cylindrical portion 12, is provided with an annular groove 18 and the bottom wall of this groove is beveled or inclined in two directions from a common point or peak 19, as best shown in Fig. 1. From this common point or peak the inclination is in opposite directions to a low point representing the greatest depth of the groove which is diametrically opposite the peak 19.

The two oppositely inclined walls thus formed in the outer face of the cap are normally engaged by the reduced end 20 of screws 21 mounted in the retaining ring 16, it being preferable to provide two screws although one will readily answer the purpose.

With the hub parts assembled, as shown in Fig. 1, any tendency of the cap to unscrew or become loose is prevented by one of the screws 21 engaging the inclined face of the cap 11, and since the cap will bind against the reduced end 20 of the screw, it is practically impossible for the cap to rotate and accidentally become loose. This also will prevent rattling and insure a positive connection between the inner and outer hubs.

In Figs. 4 to 8 inclusive there are illustrated slight modifications of my invention. The first modification is in connection with the cap and instead of providing a shank with circumferential screw threads, I provide a cap 22 with opposed shank members 23, said members having the outer walls thereof screwthreaded so as to engage diametrically opposed screwthreaded portions 24 in the end of the inner hub 3. Such construction may be considered as the "mutilated thread type" which permits of a connection being quickly established between the cap and the inner hub, it being only necessary to insert the shank members 23 in the end of the inner hub and then partially rotate the cap to interlock the shank members 23 with the threaded portions 24 of the inner hub member. This construction obviates the necessity of providing continuous threaded portions and saves material and labor.

The other modification is in connection with a circumferential groove 25 in the outer face of the cap 22, the groove 25 having inclined faces similar to the groove 18, but in said groove is a portion of greater depth than the remainder of the groove in order to provide stop shoulders 26 adapted to be engaged by the inner reduced end 27 of a screw 28 mounted in the retaining ring 16 of the hub. The stop screw 28 together with the stop shoulders 26 will limit the movement of the cap and thus define to a certain extent the locked and unlocked position of the cap relative to the inner hub member. As shown in Fig. 8, the stop shoulders may be provided by a separate groove 29 located adjacent the groove 25.

In practice, the retaining ring 16 is fixed in the outer hub 7, and permits of the cap 11 rotating when the screws 21 are adjusted to release the cap, so by rotating the cap it may be unscrewed relative to the inner hub 3 and thus cause the outer hub 7 to be shifted off of the inner hub. The mounting of the outer hub on the inner hub is accomplished by screwing the cap into the inner hub and after the cap has been tightened, the screws 21 can be set to positively hold the cap in such a tightened position.

What I claim is:—

In a hub construction for demountable wheels, the combination of an inner hub having the outer end thereof provided with a recess, an outer hub adapted to fit on said inner hub, a rotatable cap in the outer end of said outer hub, a threaded shank carried by said cap adapted to screw into the recess of said inner hub, said cap having the outer face thereof provided with inclined faces, a retaining ring mounted in the outer end of said outer hub, and screws in said retaining ring having ends engaging the inclined faces of said cap and adapted to fix said cap relative to said inner hub.

In testimony whereof I affix my signature in presence of two witnesses.

ANTHONY J. SPRANGER.

Witnesses:
 ANNA M. DORR,
 CHAS. W. STAUFFIGER.